April 14, 1959  C. A. E. BEURTHERET  2,882,449
ANODE COOLING DEVICE FOR ELECTRONIC TUBES
Filed Dec. 2, 1957
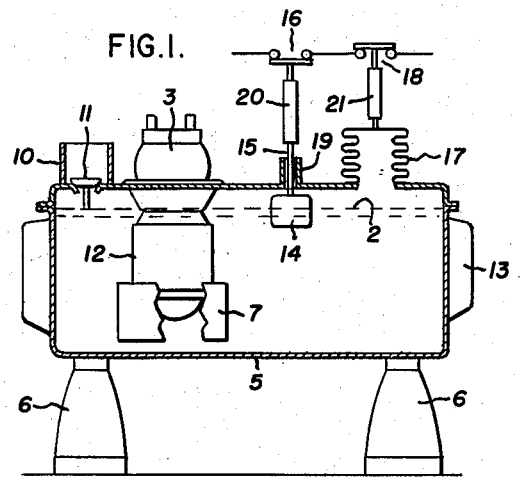
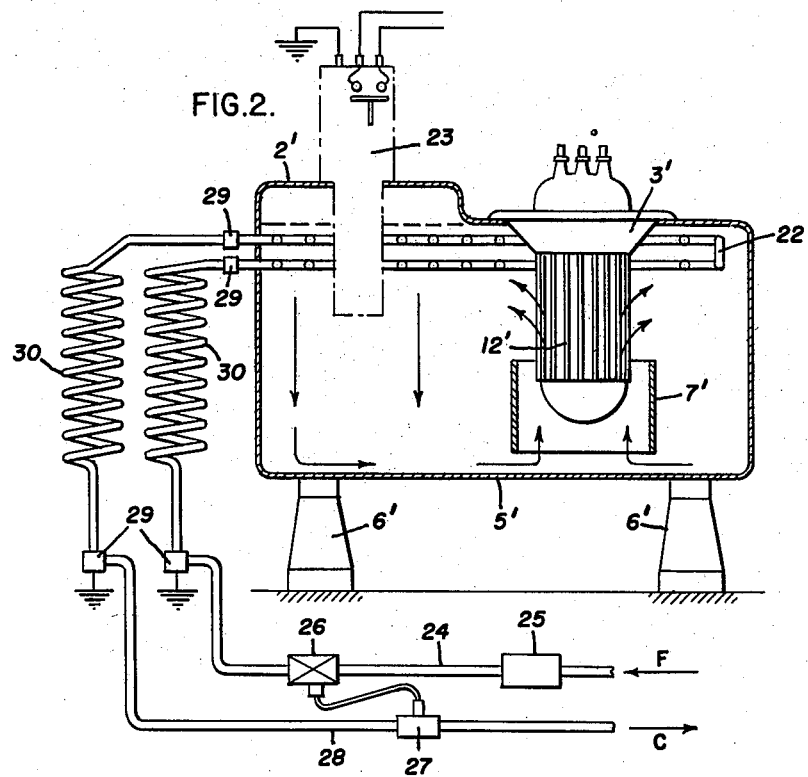
INVENTOR:
CHARLES A. E. BEURTHERET,
BY Joseph P. Kates
HIS ATTORNEY.

United States Patent Office 2,882,449
Patented Apr. 14, 1959

2,882,449

ANODE COOLING DEVICE FOR ELECTRONIC TUBES

Charles A. E. Beurtheret, Saint-Germain-en-Laye, France, assignor to Compagnie Francaise Thomson-Houston Application December 2, 1957, Serial No. 699,982

8 Claims. (Cl. 315—118)

The present invention relates to an anode heat dissipating device for electronic tubes and more particularly relates to a device for cooling during operation of electronic tubes functioning intermittently in a "Vapodyne" system wherein a boiler-condenser apparatus including auxiliary cooling devices is provided.

Early applications of "vaporization cooling" were employed for the cooling of X-ray tubes. The anode block featured a cooling duct filled with a liquid. After vaporization the liquid condensed in an external tank. First attempts to apply vaporization to the anode cooling of power tubes by these and similar means showed poor results in that unreliable operation, vibrations and shocks and low efficiency resulted. The last drawback which was growing worse as electronic tube techniques progressed caused the "threshold" point of water ebullition, to be considered as the practical limit point for water cooling applications. Many devices exist which relate to cooling by forced circulation of cold water, and many devices have been designed to prevent the generation of vapour bubbles or to tear them away from the anode wall of an electronic tube as soon as they form. Generally these methods involve water pressure, flow rate over the anode area, the setting up of active turbulence by means of small size anode obstacles breaking the flow of water, and limitation of water temperature to a point several degrees below ebullition. The "Vapodyne" system developed in the present invention therefore provides a novel and improved method to make vaporization cooling practically possible at normal atmospheric pressure and provides simplified plants without the necessity for pumps, blowers and associated equipments. The basic element of such a system may be the "Vapotron," an electronic tube with a massive anode radiator designed to eliminate the consequences of "calefaction" or heated-state phenomena. Basic features of the "Vapotron tubes" are thicker anode construction, a radiator block made an integral part of the anode which will be a good heat conductor featuring thick ribs or massive protrusions, individual size of the radial extensions being large relative to the dimensions of the vapour bubbles generated under specific operating conditions by contact with these extensions, the anode block being more massive than is usually the case with water cooled anodes and sometimes surrounded by a jacket which "canalizes" the flow of refrigerant liquid. Additionally the anode radiator may feature a metal "collar" extension of conical or curl-over shape forming the inner wall of the vapour collector. A boiler is provided which may be associated with one or several anode assemblies and may feature auxiliary devices ensuring water tightness, vapour recuperation, separation and return of the fluid which tends to be carried away with the steam, electrical insulation of water and vapour circuits, and ancillary equipment for providing for the maintenance of constant liquid level, the cooling of auxiliary elements, recuperation of the heat dissipated at the anodes of such electronic tubes and use of distilled water or other materials. For special-purpose high performance tubes, for example, to improve heat transfer on the surface of uranium bars used in certain types of reactors, individual tooth dimensions can be markedly reduced if the device is operated under pressure. The "Vapodyne" system accordingly is a self-contained system which may employ a "Vapotron" tube to provide increased efficiency in operation. Accordingly a new type of small-size "Vapotrons" has been developed along with the development of a simplified "Vapodyne" system offering fresh possibilities for industrial radio frequency applications where in the boiler-condenser assembly forms a self-contained unit "monobloc" mounting within a small volume boiler, condenser and protection system. Anode cooling by vaporization of distilled water through contact with the anode surface occurs as in usual boiler practice. In this system, the vapour, kept circulating by convection, the motion being helped by the presence of a co-axial deflector, condenses by mixing with a mass of water maintained at a temperature well below 100° C. through circulation through the coil of a heat-exchanger device. The deflector may make use of the natural thermo-siphon effect to impart a high enough rate of circulation for good heat-transfer and to keep the circulating water at the lowest mean temperature compatible with correct cooling coil operation. The quantity of distilled water held in the tank should ensure a high enough thermal inertia to prevent variations of "Vapotron" dissipation from immediately affecting the external (undistilled water) cooling circuit. The purpose of this secondary circuit will be to ensure the evacuation of the heat generated by the mean power dissipation over a period, for example, a minute or two. Because of this "Vapodyne" feature, the cooling circuit, as will be shown in one preferred embodiment hereinafter described, consumes exactly the right quantity of water required for correct cooling, this consumption being even more closely controlled, if a thermostatic valve is incorporated. It will then provide a variable output of hot water of constant temperature and can be used as a water-heater if desired. This system may be primarily designed for intermittent operation, a frequent occurence in industrial RF application, and is suitable for all conditions of operation, including continuous operation. Hence it may be seen that an important feature of the "Vapodyne system" is that "Vapotrons" operate in nonebullient water and, consequently, can dissipate higher powers than with normal boilers. Identical operating conditions can be obtained by providing a boiler (preferably of accelerated convection type) with a direct feed of very hot water to ensure vapour condensation through mixing in the boiler. For instance, for a water feed of 80° C. and a water output of 90° C., normal "Vapotron" dissipation can be increased by 50%. At 80° to 90° C., water cooling is particularly easy though a radiator, with or without fan cooling. This arrangement can be used for the cooling of "Vapotrons" subjected to excessive average loads or with bad load distribution over the anode.

The present invention is therefore concerned with an improved apparatus of the type patented in French Patent No. 1,082,673 of September 4, 1953 by Charles Beurtheret which provides a unit (monobloc) device capable of simultaneously performing the functions of boiler-condenser and the use of electronic tubes whose anode is cooled by vaporization of a liquid. In that patent in such a boiler-condenser assembly, the electronic tube requires an anode adapted to operate through the vaporization of the liquid in which it is immerged; the tank containing this liquid is of relatively large capacity and includes neither a system of pipes for the exit of vapour, nor a return pipe for the condensed water, but does include an inlet for refilling, a safety release valve, and a means of controlling the level of the liquid. The tank can be cooled naturally or can be provided with an appropriate auxiliary device (bins for natural cooling, ventilation, or a system of water piping with slow delivery). The volume of liquid contained by the tank and the minimum dimensions required for cooling action may be so chosen that the temperature of liquid always remains noticeably lower than its boiling temperature under the operating pressure, particularly at the end of each of the periods of operation of the electronic tubes. The tank requires preferably, an arrangement capable of canalizing the natural thermo-siphon effect in order to bring into contact with the anode radiator the coldest portion of liquid which is taken from the bottom of the tank.

Such an assembly operates characteristically, in that the transfer of heat at the anode contact is essentially made by evaporation, and the vapour thus produced is reabsorbed by condensation through mixture with the liquid that circulates through thermo-siphon action. This type of operation occurs up to the greatest extent of anode dissipation allowed by the structure of the tube while the main liquid body remains at a temperature sufficiently lower than its boiling temperature. If the liquid is water this difference must be greater than 10° C. In the above identified patent the illustration shown, utilizes a tank for natural cooling, adapted for intermittent operation corresponding to several minutes per hour and operating with water.

Accordingly an object of the present invention is to provide a small boiler-condenser device for electronic tube operation and wherein is provided means for indicating the falling-off point of the level of the liquid which it contains and simultaneously provides for detection of increase of pressure inside a tank.

Another purpose of the present invention is to provide a tank suitable for acting in conjunction with boiler-condenser apparatus for operation of an electronic tube wherein is provided safety devices capable of indicating the falling-off point of the liquid which the tank contains and also increase of pressure inside the tank, wherein the devices are so combined as to act directly or indirectly upon the electrical flow of the electronic tube.

Another aim of the present invention is to provide a system for electronic tube operation in which the anode of the electronic tube is immersed in a tank of liquid and wherein a level sensing and actuating device protects the electronic tube against an accidental drop of the liquid level which may be caused, for example, by either leakage or prolonged boiling of the liquid resulting in vapour loss.

Another object of the present invention is to provide a boiler-condenser apparatus for operating an electronic tube wherein loss of liquid is avoided by cutting off the electrical circuit associated with operation of the tube when the tank becomes under excessive pressure following a rapid increase of boiling in the mass of the liquid in the tank.

Another purpose of the present invention is to provide a tank for immersing of a power dissipating portion of an operating electronic tube which tank will incorporate indicating devices operating in the presence of a predetermined pressure above the liquid in the tank and operating in the condition of too low a level of liquid in the tank and wherein the pressure at which the device operates is slightly lower than that which would cause operation of a safety relief valve device.

Another object of the invention is to provide an electronic tube coolant device for operating the tube without the use of special precautions and to its fullest extent of practical useful periods of operation from short and frequent pulse operation to practically continuous operation and wherein an auxiliary cooling device permits dissipation of average power in the tank and wherein a liquid is provided with thermol inertia such that thermol flexibility sufficient to absorb the caloric energy not dissipated during each of the periods of operation of the tube is achieved.

Still another aim of the present invention is to provide a cooling device for an electronic tube wherein delivery of a coolant substance will be restricted to the strictly necessary amount for proper operation of the tube and wherein is provided automatic means for discontinuing operation of the tube in accordance with unsafe characteristics reached by said substance.

Other objects and many of the attendant advantages of this invention will be readily appreciated as the same becomes better understood by reference to the following detailed description when considered in connection with the accompanying drawings wherein:

Fig. 1 is a schematic representation of one preferred form of an illustrative embodiment of the present invention with parts shown in cross-section for clarity of illustration; and Fig. 2 is a schematic representation of a second preferred form of an illustrative embodiment of the present invention with parts shown in cross-section for clarity of illustration.

Referring now to the drawings and more particularly to Fig. 1 a tank 5 may be provided with cooling fins 13, for example, in which an electronic tube 3 includes an anode body 12 which may be constantly immersed in a liquid whose level 2 must remain higher than a specified or predetermined limit. A float 14 may be provided with a rod 15 which rod may pass freely in a sleeve 19 and which may control opening and closing of an electrical contact 16 through an intermediate insulating rod 20. Tank 5 may be supported by insulated supporting members 6.

A pressure sensitive device such as, for example, bellows 17, suitably dimensioned, may control a second electrical contact 18 through a second intermediate insulating rod 21 similar to the insulating rod 20 hereinabove mentioned. Upon operation of the level-indicating device indicating too low a level of liquid in the tank 5, caused, for example, by either leakage or a prolonged boiling of the liquid and resulting vapour loss through the operation of a safety release valve 11, the safety interlock or electrical contact 16 will open the circuit of electronic tube 3 to protect the tube. A second protective device including insulator 21 and electrical contact 18 may be linked to the bellows 17 to avoid such loss of liquid by cutting off the electrical circuit of the tube when pressure results in the tank following the rapid increase of boiling in the mass of the liquid. This pressure indicating device may be so dimensioned or formed that it will operate for a pressure slightly lower than that which would cause operation of the safety release valve 11.

In operation, assuming the level of the liquid were to drop below level 2 the float 14 would sink carrying therealong the sleeve-contained shaft 15 and the insulating device 20 which would cause contact 16 to open thereby causing interruption of the tube circuit and thus providing an automatic circuit cut-off device operable on fall-off of the liquid level to thereby protect the tube. Upon rise in pressure due to sufficient temperature rise in the liquid causing vaporization or boiling of the liquid in the tank bellows 17 will expand causing member 21 to be displaced in a direction to cause electrical contact 18 to open, similarly interrupting the tube circuit to protect the tube. As stated hereinabove the pressure responsive system 17, 21, 18 may be so dimensioned or formed so as to react to open the tube circuit before action of escape valve 11 would result to normally prevent escape of liquid in that manner, element 11 thereby acting as an additional safety precaution.

Referring more particularly to Fig. 2 of the drawings wherein is shown a second preferred embodiment of the present invention a tank 5' may be mounted on insulators 6' and may contain a system of pipes 22 with low velocity fluid flow, being maintained in pipes 22. The tank 5 may be provided with a safety device 23 which could be used in a manner corresponding to the safety release 11, the float 14, and the pressure indicating device 17 of Fig. 1. Device 23 may be of the type more fully disclosed in a French patent issued to the Compagnie Demanderesse on January 23, 1956, for "A Perfected Safety Device for Apparatus Immersed in a Tank." Although the system of pipes 22 can be operably located at many locations in the tank 5', maximum efficiency is obtained when pipes 22 are situated immediately below the tank top, contained in the liquid and near the surface of the liquid in the tank, that is, in the region where the liquid has the lowest density and the highest temperature. Piping system 22 may be made of metal, a good conductor of heat which will offer a contacting surface with the liquid in the tank 5', the extent of the contacting surface being defined by the amount of heat to be dissipated. According to one range of operation anticipated, although piping system 22 can be enlarged if desired and can be placed in more or less important portions of the tank 5' if desired, however, in accordance with efficient operation piping system 22 should be disposed so as not to interfere with the thermosiphon action produced around the anode structure 12' of the electronic tube 3' and preferably the disposition of pipe system 22 should favor the thermo-siphon action by adding its effect to that of a deflector which may be provided, such as, for example, cylinder 7. In series with the piping system 22 may be a derivative cold water piping system 24 including an anti-tartar purifier 25 through which the delivery of fluid may be governed by an automatic water gauge 26 subject to a thermostat 27 which may indicate the temperature of the water evacuated by the canalization or pipes 28. Piping system 24, 28 may be at ground potential and in the line to system 22 may be provided anti-electrolytic or insulating elements 29 between each pair of which in each of the entrance and egress lines normally insulated elements 30 are provided thus insuring isolation of the tank 5'.

As stated adjacent piping system 22 which will be at the potential of the liquid in the tank 5' may be provided anti-electrolytic or insulating elements 29 to isolate therefrom the condensing devices 30, 30 which in turn are isolated from piping systems 24 and 28 by additional anti-electrolytic or insulating elements 29 disposed between each of the systems 24 and 28 and a respective condenser 30.

In operation cold water may be piped in through piping system 24 by way of anti-tartar purifier 25 and the amount delivered may be governed by an automatic water gauge 26 and sent through circulating elements 30 via corresponding electrical isolating device 29 and thence through the pipe system 22. Return is provided through the respective electrical isolating device 29, thence through the second or return pipe coil system 30, then through the next electrical isolating device 29 and finally through pipe system 28 wherein is provided a thermostat or similar indicating device 27 to indicate the relative temperature of the water evacuated by the canalization or piping system 28. The operation of this thermostatic device, results in regulating the circulation of the secondary water in a way to ensure the exit of warm water at a constant temperature which can be selected by the studying of the thermostat 27 until a relatively increased value can be reached, as, for example, 70 or 80° C. with the tank 5' at desired liquid level condition and operating at normal atmospheric pressure. Because of linking of thermostat 27 to regulator 26, this arrangement reduces delivery of fresh water through pipe system 24 to that amount which is absolutely necessary in accordance with the rise of temperature in the tank 5'.

Restating the operation of Fig. 2, upon flow in from point F of cold water or other desired fluid from a reservoir or other source (not shown) purification by device 25 occurs and the cool liquid flows in through piping system 24, the amount of water permitted to flow being governed by regulator 26, which regulator in turn is controlled by temperature device 27. The water then flows through lower insulating device 29 through the coil 30, thence through upper insulating device 29 and is circulated through piping system 22 at a point such that slow movement of the water therethrough will cause heat to be transferred from the tube anode into the medium in which the anode is disposed, then through the metal pipes 22 into the fluid medium contained therein such that cooling of the anode 12' of tube 3' may result. On the exit cycle the water flows through upper return insulating device 29 and through the coils 30 to the pipe line 28, electrical grounding being accomplished in lower device 29 on the egress side, the hot water continuing to flow through egress pipe system 28 and being collected by the reservoir or other device at C. When the water or fluid circulating through pipe system 28 reaches a predetermined desired level of temperature more cool water is allowed to flow in through pipe system regulator 26, the device thereby providing for the minimum amount of drawing of cold water necessary to maintain safe operation of tube 3'. Device 23 which, for example, may be of the type described by Compagnie Demanderesse in its French Patent No. 1,060,761 can ensure cut-off of operation of tube 3' when the liquid level in tank 5' is below that which will be required for suitable operation.

It should be noted that within the scope of the present invention although natural or distilled water offers some excellent thermal characteristics and has advantages of economy and convenience in use, other liquids may be employed or additional substances may be provided in the water if used as the liquid such as, for example, ethyl-glycol, commonly known as "anti-freeze," whose boiling temperature is higher than that of the water. Thereby, the organic substance participates solely in the effect of heat transfer by boiling while the mixture ensures condensation and thermo-inertia for heat transfer with the external medium.

It is also contemplated as within the scope of the present invention that in the jacket or tank, several electronic tubes may be inserted, whose anodes may be connected in parallel, thereby permitting high power insulation with an extremely effective and reduced amount of anode cooling material and apparatus.

From the foregoing it may be seen that there is provided a system of boiler-condensers such that an anode body of an electronic tube may be more efficiently operated immersed in a liquid medium whose average temperature is held lower than the boiling temperature of the liquid to thus provide effective cooling of the anode and wherein is provided desirable safety features to ensure tube protection. The present invention further provides a system for improved operation of electronic tubes as, for example, of the "Vapotron" type which includes auxiliary cooling devices containing liquids for absorbing heat dissipation of the tubes to extend the limits of tube use and where additional safety is imparted by an automatic cut-off device that operates on fall-off of the liquid level or upon evidence of too high a pressure in a tank, caused by the fluid vaporization on heating of the fluid. In addition, it is demonstrated that further advantages are accomplished by the structure of the present invention permitting circulation of and regulating closely the amount of liquid absolutely necessary to maintain the tube anodes at satisfactory operating temperature characteristics, and wherein several tubes may be operated with the same apparatus.

While particular embodiments of the invention have been shown and described, it should be understood that the invention is not limited thereto and it is intended in the appended claims to claim all such variations as fall in the true spirit of the present invention.

What is claimed is:

1. Means for providing for cooling of the anode of a tube immersed in a tank containing a quantity of liquid sufficient to normally cool said tube safely when the level of the liquid and its temperature are at a suitable level, said means comprising liquid level responsive means actuated upon falling of the level of the liquid below desired level to inactivate said tube, pressure responsive means to inactivate said tube upon increase in pressure due to temperature rise of said liquid sufficient to cause conversion to gaseous state of enough liquid to actuate said pressure responsive means and a cylindrical collar member surrounding the tube anode and in spaced relationship thereto to thereby form a channel such that heated liquid will flow from the upper portion of said collar and a replacing relatively cool stream of water will enter the lower portion of said collar, said collar being relatively closely spaced from the bottom of the tank to thereby permit the relatively cool liquid to enter into the collar to thus facilitate displacement of hot liquid from the tube anode.

2. An anode cooling device for efficient use with electronic tubes having relatively large power dissipation requirements, said device comprising a tank, having a liquid contained therein, the tube having its anode submerged in the liquid, means to provide inactivation of tube operation when the level of liquid in the tank is below a predetermined level, said last-named means comprising a float disposed in said liquid, a shaft attached to said float and superimposed thereon, a sleeve to guide reciprocating movement of said shaft, said shaft being slidably disposed in said sleeve, an electrical insulating shaft attached to said sleeve guided shaft, and electrical interlock means connected to said insulating shaft, thereby causing said interlock to be opened when said float is lowered in position due to the liquid level of the surface of the liquid being below a predetermined level and the shaft thereby being displaced to open said interlock, a pressure responsive device in spaced relationship to the surface of said liquid, a second interlock actuated by said pressure responsive device under pressure exceeding a predetermined amount to open to thereby cause inactivation of said tube thereby providing for safe operation of said tube by ensuring inactivation therefor when the liquid is below predetermined level or is at a temperature such that excessive vapour is formed from the liquid.

3. In an apparatus for cooling an electronic tube during tube operation wherein said apparatus includes a tank, a liquid disposed in said tank and said tube has its anode immersed in said liquid, means for maintaining the level of the liquid at a predetermined safe point and means for ensuring that the temperature of the liquid will permit safe operation of the electronic tube, said liquid level maintaining and safe operating temperature means comprising a safety gas pressure escape valve disposed on said tank to permit egress of gas formed by evaporation of said liquid when the gas reaches a predetermined pressure, a float member disposed in said liquid, a sleeve member, a shaft slidably disposed in said sleeve, one end of said shaft being attached to said float, an insulating member attached to the other end of said shaft, an electrical contact attached to said insulating member, lowering of the liquid level causing the float to follow the level of the liquid to thereby cause the shaft to be displaced in the sleeve such that the contact will be pulled to open position, said contact in closed condition serving to close the operating circuit of the electronic tube, and in open position opening the operating circuit, a second contact member in the tube operating circuit, a second insulating member to place and displace said contact member, a pressure responsive bellows member attached to said insulating member and disposed above the surface of the liquid and spaced therefrom, thereby when the liquid is at a sufficient temperature to cause sufficient gas vapour to be released extending the bellows device to thereby displace the second insulating member to force the second contact of said circuit to open position to thereby cause ceasing of operation of the tube, the bellows device being arranged to be actuated at a predetermined pressure slightly below the pressure necessary to cause the said escape valve to open.

4. Apparatus for ensuring safe operation of a power tube, said apparatus comprising a tank member in which a power dissipating portion of the tube is disposed, a body of liquid disposed in said tank member, entrance piping means to permit flow of relatively cool liquid into said tank, egress piping means to permit flow of relatively hot liquid out of said tank, pipe system means to circulate liquid in cooling position with relation to the power dissipating portion of said tube, said pipe system containing said circulating liquid being disposed between the entrance and egress piping means so as to be supplied by cool liquid from the entrance pipe means and to supply heated liquid to the egress pipe means, means to provide electrical insulation of said entrance and egress pipes and said entering and leaving liquid from the liquid and the piping system in the tank, and means to regulate the amount of flow of said cool liquid into the tank pipe in accordance with the temperature of the liquid leaving the system through the egress means.

5. The apparatus of claim 4 including safety means to cause opening of the circuit of said tube when the tank liquid is at a predetermined high temperature point and when the tank liquid is below a predetermined level.

6. Means providing for cooling of an operating electronic tube, said means comprising a tube portion containing jacket, fluid disposed in said jacket for cooling said tube when said tube is in operation and disposed in said jacket, said fluid substantially surrounding the anode of said tube, means to maintain the level of the liquid in said jacket at a predetermined level with relation to said tube anode, said last-named means comprising first and second electrical contact means to open the circuit of said tube to thereby cause said tube to go out of operating condition, float means associated with said first contact means to cause said first contact to open when the level of said liquid falls below a predetermined level, pressure actuated means associated with said second contact to cause said second contact to open when the vapour above the liquid surface level due to temperature of the liquid exceeds a predetermined pressure, emergency escape valve means responsive to a pressure above said last-named pressure to cause escape of said vapour upon reaching a pressure higher than the pressure required to operate said pressure actuated means, a tank member into which said jacket is immersed, said tank member having its base portion contiguous to the lower portion of said jacket to thereby cause circulatory stream flow of hot liquid and vapor from the tube anode into the portion of the tank surrounding the jacket from the top portion of the jacket through tank and to the lower end of the jacket and causing replacing cool liquid to enter the jacket at its lower end.

7. The apparatus of claim 6 wherein said fluid is water containing an anti-freeze organic substance mixed therein.

8. Apparatus for providing cooling of the anode of a tube disposed therein, said apparatus comprising a fluid carrying piping means arranged to be disposed in the vicinity of the anode of said tube, said fluid piping means comprising an entrance means wherein fluid is supplied, means to purify the fluid supplied at said entrance means, means to regulate the amount of fluid flow into said piping system, said fluid flowing in relatively close proximity to the anode of said tube at a comparatively slow rate, pipe line means to provide egress of said fluid from the vicinity of said tube anode, a temperature responsive indicating device in the line of fluid egressing from said system, means to couple between the fluid input regulator and the output fluid temperature responsive device to thereby actuate the regulator to permit fluid input only to the extent necessary as indicated by temperature above a predetermined desired temperature on said temperature indicating device, and means to cause interruption of operation of said tube when the temperature and pressure of said chamber in which the tube is disposed reaches above predetermined limits.

References Cited in the file of this patent

UNITED STATES PATENTS

| | | |
|---|---|---|
| 2,084,545 | Winogard | June 22, 1937 |
| 2,256,757 | Durand | Sept. 23, 1941 |
| 2,383,620 | Rudd | Aug. 28, 1945 |
| 2,472,157 | Gordon | June 7, 1949 |